Patented May 29, 1951

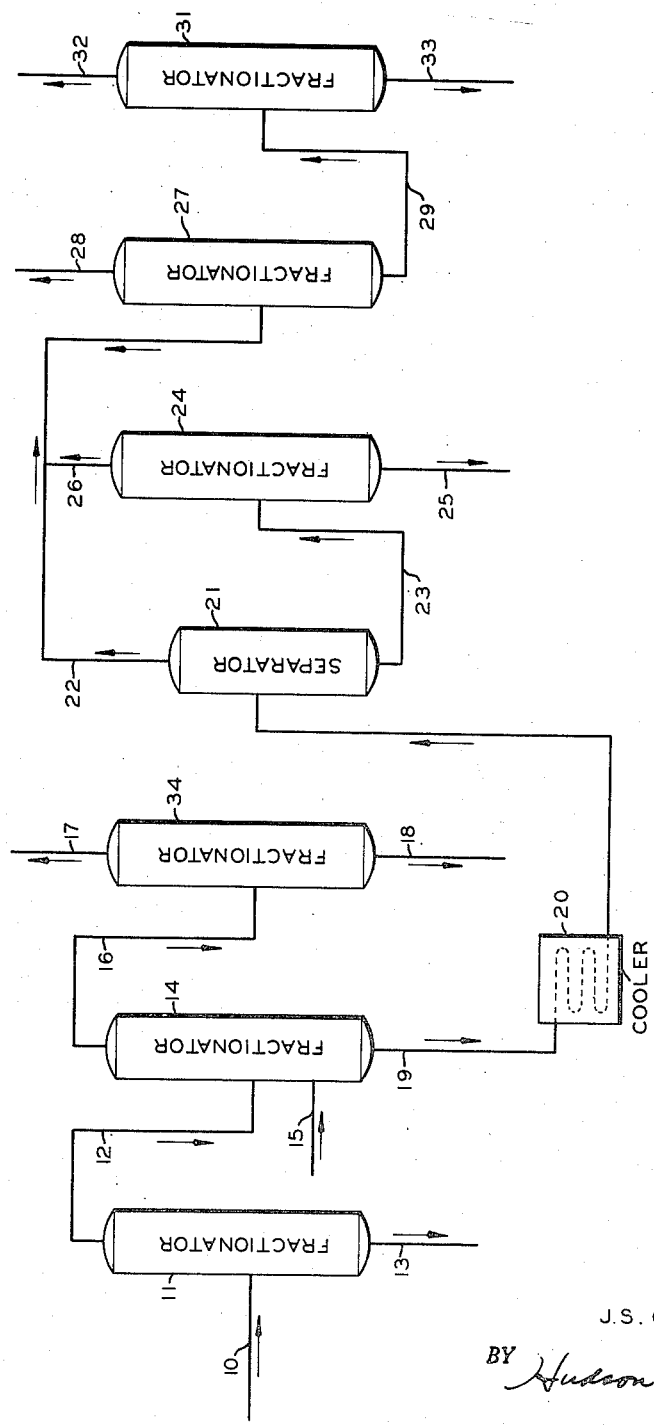

2,555,185

UNITED STATES PATENT OFFICE 2,555,185

RECOVERY OF ORGANIC COMPOUNDS FROM AQUEOUS CARBON OXIDE HYDROGENATION PRODUCT

John S. Cromeans, Dewey, Okla., assignor to Phillips Petroleum Company, a corporation of Delaware Application December 19, 1949, Serial No. 133,905

7 Claims. (Cl. 202—57)

This invention relates to a process for the recovery of organic compounds. In a specific aspect this invention relates to a process for the recovery of oxygenated organic compounds contained in the aqueous phase recovered from the condensed effluent resulting from the catalytic hydrogenation of a carbon oxide. In one embodiment this invention relates to a process for preventing organic acid contamination of non-acidic oxygenated organic compounds in the recovery of such compounds from the effluent from the catalytic hydrogenation of carbon monoxide.

In processes for the catalytic hydrogenation of carbon monoxide to produce normally liquid hydrocarbons, substantial amounts of oxygenated hydrocarbon derivatives, such as acids, alcohols, aldehydes and ketones, are produced. Upon condensation of the reaction effluent the normally liquid reaction products form two separate phases, viz. an upper hydrocarbon phase and a lower aqueous phase. The oxygenated hydrocarbon derivatives have at least a limited solubility in each phase, and consequently they are distributed between the two phases. However, most of the low-boiling oxygenated compounds are present in the aqueous phase, and various processes have been devised for the recovery of the oxygenated compounds from the aqueous phase. However, the aqueous phase contains organic acids as reaction products, and it is difficult to recover the oxygenated compounds, other than the acids, from the aqueous phase completely free of acids.

It is an object of this invention to provide a novel process for the recovery of the oxygenated organic compounds resulting from the catalytic hydrogenation of carbon monoxide.

It is another object of this invention to recover those oxygenated organic compounds, other than organic acids, free of acids.

It is another object of this invention to recover oxygenated organic compounds from such a hydrogenation process without polymerization of aldehydes in the oxygenated compounds.

It is a further object of this invention to provide a novel process for removing small quantities of organic acids from admixture with other oxygenated organic compounds without polymerization of aldehydes contained therein.

Further and additional objects and advantages of my invention will be readily apparent from the disclosure hereinbelow.

I have found that organic acids in the aqueous phase resulting from the catalytic hydrogenation of carbon monoxide can be separated from the other oxygenated organic compounds in the aqueous phase by neutralizing the acids with an alkaline material without the attendant polymerization of aldehydes therein.

The accompanying drawing is a schematic diagram of one method of effecting my invention. It will be understood that modifications within the scope of my invention will be readily apparent to those skilled in the art. It will also be understood that conventional equipment, such as valves, pumps, compressors, and the like, has not been included in the accompanying drawing, but the inclusion of such equipment is within the scope of my invention.

To effect my invention the aqueous phase from the hydrogenation of carbon monoxide is distilled to take overhead those components of the aqueous phase or their azeotropes boiling below 100° C. In a batch operation this distillation is effected at an overhead temperature of at least 90° C., but below 100° C., at atmospheric pressure. If higher pressures are employed, the overhead temperature may be increased accordingly. In a continuous operation, such as that described in the accompanying drawing, the distillation is effected at an overhead temperature of at least 75° C. but below the boiling point of water at the operating pressure. At atmospheric pressure the overhead temperature is within the range of 75 to 85° C., and at a pressure of 30 pounds per square inch gauge the overhead temperature is 105 to 115° C. Pressure operation of this distillation step is preferred, since it enables a reduction in the size of the column and in the operating costs. The overhead fraction from this distillation contains a relatively small amount of water and non-acidic oxygenated compounds boiling below about 140° C. which includes amyl alcohols, lower-boiling alcohols, aldehydes and ketones. Although the butyl and amyl alcohols boil above the boiling point of water, these alcohols form minimum boiling azeotropes with water that boil below the boiling point of water. Thus, these alcohols are found in the overhead from this distillation step. The kettle product from this distillation step contains water and organic acids, such as acetic acid, propionic acid and butyric acid, and the kettle product may be processed by any known means for recovery of these acids. This distillation step is not essential to my process, and, if desired, the entire aqueous phase may be fractionally distilled in the presence of alkaline material, in a manner to be described hereinbelow. However, this distillation removes large quantities of water and a major proportion of the acids from the aqueous phase. Consequently, the size of the equipment and the amount of alkaline material required in subsequent steps in my process are reduced. The aqueous phase may contain as much as 85 to 90 volume per cent water, but by employing a distillation column of 5 to 15 theoretical plates and operated at the overhead temperatures discussed above, an overhead fraction containing 10 to 15 volume per cent water can be obtained.

The first distillation step removes most of the organic acids from the aqueous phase, but the overhead fraction, which may be termed the organic concentrate, contains a relatively small concentration of organic acids. This acid concentration is usually within the range of 0.1 to 2.0 weight per cent. The other components of the organic concentrate are primarily $C_2$ to $C_4$ aldehydes, $C_1$ to $C_5$ alcohols, acetone, methyl ethyl ketone. The components may be separated from the organic concentrate in relatively pure or industrially useful form. However, the presence of small amounts or even traces of organic acids in the non-acidic oxygenated organic compound fractions is undesirable. The acids may cause the aldehydes to polymerize to form higher boiling aldehydes and resinous materials. Also, the acids may cause the aldehydes and alcohols to interact to form acetals that may cause contamination problems.

In order to remove the organic acids from the organic concentrate I fractionally distill the organic concentrate in the presence of sufficient alkaline material to neutralize all the acids in the organic concentrate. The presence of the alkaline material tends to cause polymerization of the aldehydes in the organic concentrate. In order to prevent such polymerization I introduce the alkaline material to the fractionating column at a point below the point of introduction of the organic concentrate. If the organic concentrate is fed into the middle of the fractionating column, aldehydes will be present in the upper portion of and the overhead from the column and organic acids will be present in the lower portion of the column. Polymerization of the aldehydes is prevented by introducing the alkaline material to the column at a point below which no aldehydes are present. The alkaline material neutralizes all the organic acids in the column, and consequently, the non-acidic oxygenated compounds are withdrawn from the process acid-free.

Typical examples of the alkaline materials that may be emplyed in my process are the hydroxides, oxides and carbonates of alkali and alkaline earth metals, usually in an aqueous solution, but any alkaline material suitable for the neutralization of the organic acids may be employed. The more common alkaline materials are sodium hydroxide, potassium hydroxide, calcium hydroxide, calcium oxide, sodium carbonate, potassium carbonate and calcium carbonate, but these are merely illustrative of the alkaline materials. The amount of alkaline material employed is at least sufficient to neutralize all the organic acids. An excess of alkaline material may be employed, but it is not economically desirable to do so. Thus, the pH of the bottoms product from the distillation of the organic concentrate is at least 7.0, and, if an excess of alkaline material is used, the pH of the bottoms product will be above 7.0.

Referring now to the accompanying drawing, aqueous phase separated from the effluent of a carbon monoxide hydrogenation reactor is introduced to fractionator 11 via line 10. This aqueous phase may have previously been separated from the hydrogenation effluent in any suitable manner. For example, the hydrogenation effluent may have been quenched with methanol to concentrate the lower boiling oxygenated compounds in the aqueous phase in accordance with my copending application, Serial No. 101,225, filed June 24, 1949, after which the aqueous phase is passed to fractionator 11. Fractionator 11 is operated at an overhead temperature of 80° C., and the aqueous phase is separated into an overhead product or organic concentrate containing $C_1$ to $C_5$ alcohols, $C_2$ to $C_4$ aldehydes, acetone, methyl ethyl ketone, esters, from 10 to 15 volume per cent water, and from 0.1 to 2.0 weight per cent organic acids. The bottoms product from fractionator 11, containing water and organic acids, is removed via line 13, and it may be treated further by means not shown for the recovery of the organic acids.

The organic concentrate or overhead from fractionator 11 is withdrawn via line 12 and introduced to fractionator 14 at about the middle thereof. Fractionator 14 is operated in a manner that methanol, an ethanol-water azeotrope, aldehydes and ketones are taken overhead via line 16. This overhead from fractionator 14 is then fractionated in fractionator 34 to take overhead methanol, aldehydes, ketones and esters and to obtain as a bottoms product ethanol, and water. The overhead from fractionator 34 is withdrawn via line 17, and the bottoms product is withdrawn via line 18. If desired, both fractions may be subjected to further separation steps to purify the products.

Sodium hydroxide is introduced to fractionator 14 via line 15 at a point below the point of introduction thereto of the organic concentrate. At and below the point of introduction of the sodium hydroxide no aldehydes are present in fractionator 14, thus assuring recovery of all the aldehydes in the organic concentrate in the overhead from fractionator 14. It is preferred to introduce the sodium hydroxide to fractionator 14 about two plates below the feed plate for the organic concentrate, but the alkaline material may enter at a lower point in the column. Organic acids are present in the column below the point of introduction of organic concentrate to the column, and they are neutralized and thus rendered non-volatile by reaction with sodium hydroxide to form sodium salts of the acids. The neutralization of the acids in the column prevents their going overhead with the aldehydes. Sufficient sodium hydroxide is employed to neutralize all the organic acids and the bottoms product from fractionator 14 is completely free of acids. The bottoms product containing alcohols higher boiling than ethanol, water and sodium salts is withdrawn via line 19 and cooler 20 to separator 21. This bottoms product forms an organic phase and an aqueous phase. The organic phase containing the alcohols higher boiling than ethanol is withdrawn from separator 21 via line 22 and thence passed to fractionator 27. The lower or aqueous phase from separator 21 is removed via line 23 to fractionator 24 where water and organic acid salts are removed as kettle product via line 25. This kettle product may be treated further by means not shown for recovery of the organic acids from their salts. The overhead from fractionator 24 contains alcohols higher boiling than ethanol and water, and it is withdrawn via line 26 and passed to fractionator 27 with the organic phase from separator 21.

From fractionator 27 an overhead containing propyl alcohol and the water in the column feed, since the feed normally contains less than sufficient water to form an azeotrope with all the propyl alcohol, is withdrawn via line 28. The dry kettle product is removed via line 29 to fractionator 31 from which butyl alcohol is removed overhead via line 32 and a kettle product containing amyl alcohol is removed via line 33.

It will be obvious to those skilled in the art that the products obtained from the above-described system are not completely pure. However, the degree of purification may be adequate to provide products that in some cases may be employed commercially. Also, all or any part of these products may be subjected to further purification for removal of impurities. However, the products are acid-free and no aldehydes are withdrawn from the system in the form of polymers or resinous material.

*Example*

The aqueous layer from a carbon monoxide hydrogenation process employing a fluidized iron catalyst is charged to a packed column of eight equivalent plates and distilled in a batch process at an overhead temperature of 98° C. The overhead product contains 11.5 per cent of the column feed, and it contains about 14 volume per cent water. This product, which is a concentrate of the non-acidic oxygenated compounds, contains 1.9 weight per cent organic acids.

The overhead product from the above distillation is charged to a second fractionation column, the column being operated to take the ethanol-water azeotrope overhead. At a point sufficiently below the feed point that aldehydes are not present sufficient sodium hydroxide in an aqueous solution is introduced into the column to neutralize all the acids contained in the feed. The overhead and kettle products from this column are recovered substantially free of organic acids.

From the above detailed disclosure and the accompanying drawing numerous modifications of my process within the scope of my invention will be readily apparent to those skilled in the art.

I claim:

1. The process for recovering oxygenated organic compounds from an aqueous phase resulting from the catalytic hydrogenation of a carbon oxide which comprises introducing said aqueous phase to a fractional distillation zone at a point intermediate the top and bottom of said zone, fractionally distilling said aqueous phase in said zone in a manner that aldehydes and no acids from said aqueous phase appear in the overhead from said fractional distillation, and introducing sufficient alkaline material to said fractional distillation zone to neutralize all the acids from said aqueous phase at a point sufficiently below the point of introduction of said aqueous phase that no aldehydes are in contact with said alkaline material.

2. The process for recovering oxygenated organic compounds from an aqueous phase resulting from the catalytic hydrogenation of carbon monoxide which comprises distilling said aqueous phase at an overhead temperature of at least 75° C. but below the boiling point of water, introducing the overhead fraction from said distillation step to a fractional distillation zone at a point intermediate the top and bottom of said zone, fractionally distilling said overhead fraction in said fractional distillation zone in a manner that aldehydes and no acids from said overhead fraction are taken overhead from said fractional distillation, and introducing sufficient alkaline material to said fractional distillation zone to neutralize all the acids from said first-named overhead fraction at a point sufficiently below the point of introduction of the overhead fraction from said aqueous phase that no aldehydes are in contact with said alkaline material.

3. The process for recovering oxygenated organic compounds from an aqueous phase resulting from the catalytic hydrogenation of carbon monoxide which comprises distilling said aqueous phase at a temperature below the boiling point of water to obtain an overhead fraction containing alcohols, aldehydes, ketones, 0.1 to 2.0 weight per cent organic acids and 10 to 15 volume per cent water, introducing said overhead fraction to a fractional distillation zone at a point intermediate the top and bottom of said zone, fractionally distilling said overhead fraction in a manner that the aldehydes, ketones and alcohols containing no more than two carbon atoms per molecule are in the upper portion of said fractional distillation zone and higher boiling alcohols and acids are in the lower portion of said fractional distillation zone, and introducing sufficient alkaline material to said fractional distillation zone to neutralize all the acids therein at a point sufficiently below the point of introduction of the overhead fraction from said aqueous phase that no aldehydes are in contact with said alkaline material.

4. The process for recovering oxygenated organic compounds from an aqueous phase resulting from the catalytic hydrogenation of carbon monoxide which comprises distilling said aqueous phase at a temperature below the boiling point of water to obtain an overhead fraction containing alcohols, aldehydes, ketones, 0.1 to 2.0 weight per cent organic acids and 10 to 15 volume per cent water, introducing said overhead fraction to the middle of a fractional distillation zone, fractionally distilling said overhead in a manner that the aldehydes, ketones, methyl alcohol and ethyl alcohol are taken overhead and organic acids, propyl alcohol, butyl alcohol and amyl alcohol are in the lower portion of said fractional distillation zone, and introducing sufficient alkaline material to the lower portion of said fractional distillation zone to produce a bottoms product having a pH of at least 7.0 at a point sufficiently below the point of introduction of the overhead from said aqueous phase that no aldehydes are in contact with said alkaline material.

5. A process according to claim 4 wherein the alkaline material is an alkali metal hydroxide.

6. A process according to claim 4 wherein the alkaline material is sodium hydroxide.

7. A process according to claim 4 wherein the alkaline material is introduced to the fractional distillation zone at least two trays below the feed tray for the overhead from the distillation of the aqueous phase.

JOHN S. CROMEANS.

No references cited.